US007057310B2

(12) United States Patent
Liu et al.

(10) Patent No.: US 7,057,310 B2
(45) Date of Patent: Jun. 6, 2006

(54) DUAL-OUTPUT VOLTAGE REGULATOR

(75) Inventors: Kwang H. Liu, Taipei (TW); Sorin L. Negru, San Jose, CA (US); Terry Groom, Palos Verdes Lakeway, TX (US); Fu-Yuan Shih, Taipei (TW); Te-Jen Hsieh, Taipei (TW)

(73) Assignee: Arques Technology (TW)

( * ) Notice: Subject to any disclaimer, the term of this patent is extended or adjusted under 35 U.S.C. 154(b) by 577 days.

(21) Appl. No.: 10/377,781

(22) Filed: Mar. 4, 2003

(65) Prior Publication Data

US 2004/0070276 A1 Apr. 15, 2004

(30) Foreign Application Priority Data

Oct. 9, 2002 (TW) ................................ 91123252 A

(51) Int. Cl.
*H01H 35/00* (2006.01)
*H02B 1/24* (2006.01)

(52) U.S. Cl. ...................................................... 307/126

(58) Field of Classification Search ................. 307/126
See application file for complete search history.

*Primary Examiner*—Brian Sircus
*Assistant Examiner*—Hal I. Kaplan
(74) *Attorney, Agent, or Firm*—Bacon & Thomas PLLC

(57) ABSTRACT

A dual-output voltage regulator is disclosed, which provides a first terminal voltage and a second terminal voltage to DDR DRAM. The dual-output voltage regulator comprises a first regulator unit for receiving an input voltage and providing the first terminal voltage via a first transistor unit; and a second regulator unit for receiving the input voltage and the first terminal voltage in order to output the second terminal voltage, wherein the second terminal voltage is half of the first terminal voltage.

33 Claims, 5 Drawing Sheets

DUAL-OUTPUT VOLTAGE REGULATOR

BACKGROUND OF THE INVENTION

1. Field of the Invention

The present invention relates to linear regulators and, more particularly, to a low dropout regulator capable of sinking and sourcing current, and of regulating a first output voltage that is exactly half of a second output voltage.

2. Description of Related Art

Currently, double data rate (DDR) DRAM devices are getting popular and have the potential to replace the synchronous dynamic RAM (SDRAM) devices. As the data rate increases, the data communication between a CPU and a DDR DRAM requires careful design to minimize signal reflection and ringing. FIG. 1A shows a representative data line of a conventional data bus system. The data line is connected to ground through a termination resistor 15 (RT). A line driver 12 operates with a supply voltage of VDDQ 11, typically 2.5V. The series resistance 13 (RS) of data line 14 is typically in the order of 10 Ω. A termination resistor 15 (RT), with a typical resistance of 56 Ω, is connected to the receiving end of the data line 14 to reduce high-speed signal reflection and ringing. A plurality of line receivers, exemplified by buffers 16 and 17, are connected to the receiving end of data bus line 14. The negative inputs of buffers 16 and 17 are connected to a reference 18, which is exactly one half of VDDQ voltage, or 1.25V.

When the line driver 12 output is a high state, 2.5V, the power dissipation of the data line is $VDDQ^2/(RS+RT)$, or 94.7 mW. When the line driver 12 output is a low state, the power dissipation is 0. Assuming the line driver 12 has 50% probability in high state, and 50% probability in low state, its average power dissipation would be 47.3 mW.

FIG. 1B shows a data bus line 24 with a similar structure, but its termination resistor 25 is connected to a regulated voltage 29 (VTT), which is half of VDDQ voltage. Line driver 22 is powered by a VDDQ voltage 21, or 2.5V. The series resistance 23 of data line 24 is 10 Ω. The termination resistance 25 is 56 Ω. Buffers 26 and 27 are connected to the receiving end of data bus line 24.

When the output of line driver 22 is a high state, or 2.5V, its power dissipation is $(VDDQ-VTT)^2/(RS+RT)$, or 23.7 mW. When it is a low state, or 0V, the power dissipation is $VTT^2/(RS+RT)$, or 23.7 mW. Therefore, either in high or low state, the average power dissipation of the data line is always 23.7 mW.

The calculation above clearly shows that, by connecting the termination resistors to a voltage half of VDDQ, the power dissipation can be cut down by 50%. In a typical DDR DRAM data bus system, there may be as many as 110 data lines. The power dissipation saving will be 2.607 W, a significant amount.

However, in order to achieve power saving, the termination voltage VTT 29 requires both sinking and sourcing current capability. When there are more lines in high states than in low states, VTT 29 needs to draw (sink) current from the data bus system. On the other hand, when there are more lines in low state than in high state, VTT 29 needs to supply (source) current to the data bus system.

VDDQ 21 is typically adjustable between 2.5V and 2.8V with a maximum peak current of 5 A. VTT 29 has a maximum source or sink current of 3 A. In general, VTT 29 is required to be kept at one half of VDDQ 21 voltage.

In a typical computer system, there are 3.3V and 5V power supplies available. A switching regulator or a linear regulator is used to derive the VDDQ voltage from the 5.0V or the 3.3V power source. A linear regulator is not as efficient as a switching regulator, but it requires no inductors and very few external components, and has relatively low cost. Recently, more and more DDR DRAM systems choose linear regulators to supply the VDDQ and VTT power.

SUMMARY OF THE INVENTION

The object of the present invention is to provide a dual-output voltage regulator, which integrates two regulators into a 5-pin package for reducing package cost, saving PC board space and simplifying the heat sink issues.

Another object of the present invention is to provide a dual-output voltage regulator fabricated in a single chip that has only five pins.

In the present invention, the dual-output voltage regulator packaged in a 5-pin chip provides a first terminal voltage and a second terminal voltage to a DDR DRAM data bus system. The dual-output voltage regulator comprises a first regulator unit, which includes a first transistor unit and a comparator unit, the first regulator unit receiving input voltage from a PC system and providing the first terminal voltage via the first transistor unit, the comparator unit connecting to one of the pins to provide shutdown function by inputting a shutdown signal via this pin; and a second regulator unit, which includes a second transistor unit, a third transistor unit and a divided voltage unit, the second regulator receiving the input voltage and the first terminal voltage such that the divided voltage unit provides a plurality of reference voltages to control the second transistor in terms of outputting the second terminal voltage, wherein the second terminal voltage is half of the first terminal voltage, and the second regulator unit is capable of sourcing current and sinking current.

In another aspect of the present invention, the dual-output voltage regulator packaged in a 5-pin chip provides a first terminal voltage and a second terminal voltage to double data rate DRAM. The dual-output voltage regulator comprises: a first regulator unit, which includes a first transistor unit and a comparator unit, the first regulator unit receiving an input voltage from a PC system and providing the first terminal voltage via the first transistor unit, the comparator unit connecting to one of the pins to provide shutdown function by inputting a shutdown signal via this pin; and a second regulator unit, which includes a first Darlington pair circuit and a second Darlington pair circuit, and receives the input voltage and the first terminal voltage so as to output the second terminal voltage, wherein the second terminal voltage is half the first terminal voltage, and the second regulator unit is capable of sourcing and sinking current.

Other objects, advantages, and novel features of the invention will be elaborated in the detailed description with drawings.

DETAILED DESCRIPTION OF THE PREFERRED EMBODIMENT

Figure 1A:
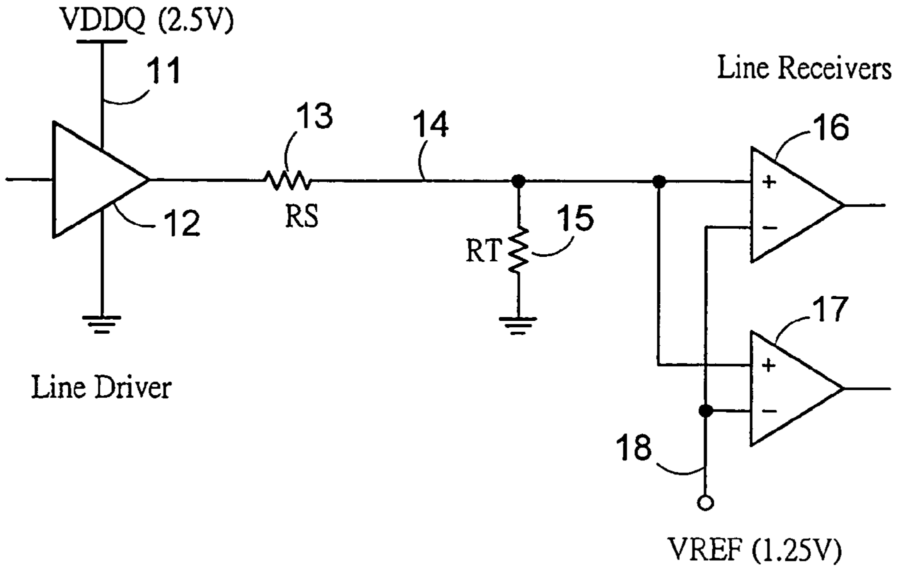
FIG. 1A (Prior Art)
FIG 1A shows a conventional data bus line termination scheme with a termination resistor connected between a data bus line and the ground.
Figure 1B:
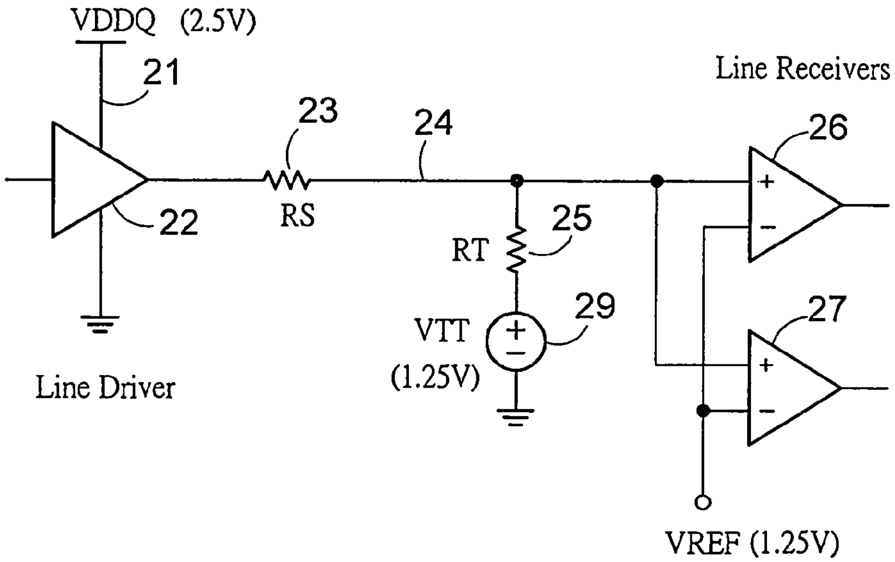
FIG. 1B (Prior Art)
FIG. 1B shows a data bus line termination scheme with a termination resistor connected between a data bus line and a termination voltage.
Figure 2:
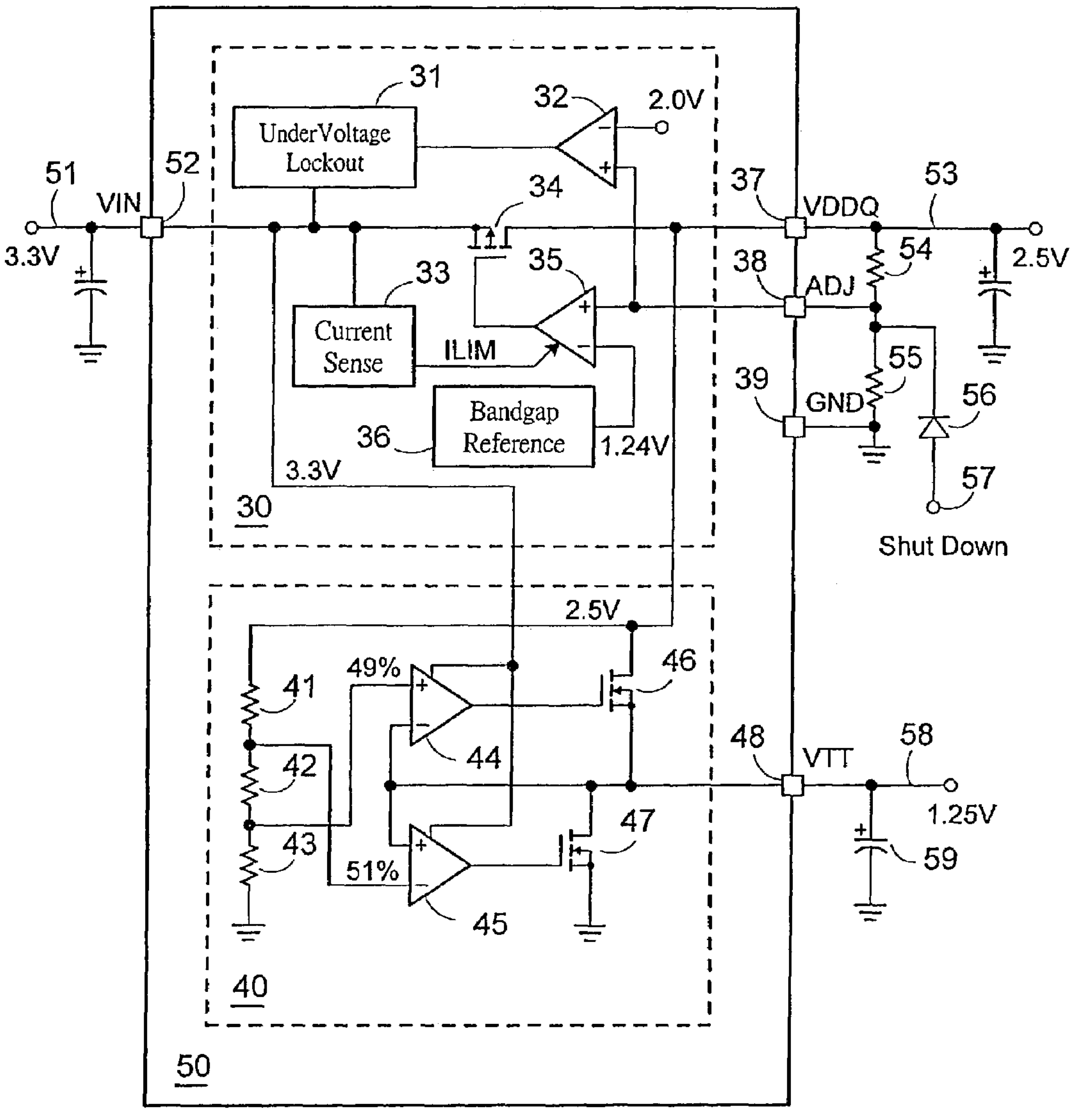
FIG. 2 shows a first embodiment of the present invention using a P-type MOSFET for VDDQ regulator and two N-type MOSFETs for VTT regulator.

A first preferred embodiment of the dual-output voltage regulator in accordance with the present invention will be described herein. Referring to FIG. 2, a P-type MOSFET is provided for controlling the VDDQ voltage, and two N-type MOSFETs are provided for controlling the VTT voltage. In this embodiment, a first low dropout regulator (LDO) 30 (as VDDQ regulator) and a second LDO 40 (as VTT regulator) are combined in a power package 50 that has five pins, wherein the five pins are VIN pin 52, VDDQ pin 37, ADJ pin 38, GND pin 39 and VTT pin 48.

The first LDO 30 comprises an under-voltage lockout circuit (UVLO) 31, a current limit circuit 33, an OP-AMP 35, a P-type MOSFET 34, a bandgap reference 36 and a shut-down comparator 32.

The input (source) of P-type MOSFET 34 is connected to an input voltage 51 via pin 52 of power package 50. The output (drain) of P-type MOSFET 34 provides a VDDQ voltage 53 via pin 37 of power package 50. Under-voltage lockout circuit 31 ensures the proper operation of the first LDO 30 and the second LDO 40 of the power package 50. In other words, the first LDO 30 and the second LDO 40 can operate when the voltage of input voltage 51 is higher than a preset threshold level, for example, 3.0V.

The current limit circuit 33 senses the magnitude of load current passing through P-type MOSFET 34. If it detects an over-current condition, a signal will be sent to OP-AMP 35 to reduce the source-gate voltage ($V_{SG}$), thus throttling down the output current. Bandgap reference 36 provides a precise reference, for example, 1.24V±1%, for the OP-AMP 35.

The output of OP-AMP 35 is connected to the gate of P-type MOSFET 34. It regulates the $V_{SG}$ voltage of P-type MOSFET 34, which in turn keeps VDDQ 53 at a constant voltage. The positive input of OP-AMP 35 is connected to the ADJ pin 38, which is connected to a voltage divider comprising resistors 54 and 55. Since OP-AMP 35 has a large DC gain, it will force the voltage on its positive input (ADJ pin 38) to follow the negative input, i.e. the 1.24V reference. As a result, VDDQ 53 remains at $1.24V\cdot(1+R_{54}/R_{55})$.

If VDDQ 53 tries to move higher than $1.24V\cdot(1+R_{54}/R_{55})$, due to, for instance, a reduced load current, the voltage on ADJ 38 will start to move above 1.24V. OP-AMP 35 will then in turn push the gate voltage of P-type MOSFET 34 higher, thus reducing $V_{SG}$ of P-type MOSFET 34 and the current supplied to the output. The output voltage therefore quickly restores to $1.24V\cdot(1+R_{54}/R_{55})$.

On the other hand, if VDDQ 53 tries to move lower than $1.24V\cdot(1+R_{54}/R_{55})$, for example, due to an increased load current, the voltage on ADJ 38 will start to move below 1.24V. OP-AMP 35 will then pull the gate voltage of P-type MOSFET 34 lower, thus increasing $V_{SG}$ of P-type MOSFET 34 and the current supplied to the output, whose voltage therefore quickly restore to $1.24V\cdot(1+R_{54}/R_{55})$.

Further, ADJ pin 38 can also function as a shutdown pin. A shutdown input 57 can be connected to ADJ pin 38 via a diode 56. If shutdown input 57 is kept low, typically less than 0.5V, diode 56 will be off and appear as high impedance, which nevertheless will not interfere with the normal voltage divider operation of resistors 54 and 55. However, if the shutdown input 57 is pulled higher than, for example, 2.7V, the diode 56 will conduct, trigger the comparator 32 and shut down the first LDO 30 and the second LDO 40.

The second LDO 40, capable of sourcing and sinking output current, comprises a plurality of divided voltage resistors 41, 42 and 43, two OP-AMPs 44,45 and two N-type MOSFETs 46 and 47.

The input (drain) of N-type MOSFET 46 is connected internally to pin 37. In other words, the drain of N-type MOSFET 46 is connected to VDDQ output voltage 53. The output (source) of N-type MOSFET 46 provides a source current to a VTT voltage 58 via VTT pin 48. The external of VTT pin 48 is also connected to a filter capacitor 59. The input (drain) of N-type MOSFET 47 is connected internally to VTT pin 48. The output (source) of N-type MOSFET 47 is connected to ground via GND pin 39.

VTT pin 48 is connected internally to the negative input of OP-AMP 44, as well as the positive input of OP-AMP 45. The voltage-dividing resistors 41, 42, and 43 create two reference voltages, one 49% of VDDQ voltage 53, the other 51% of VDDQ voltage 53. The positive input of OP-AMP 44 has a reference voltage of 0.49·VDDQ. The negative input of OP-AMP 45 has a reference voltage of 0.51·VDDQ.

If VTT voltage 58 tries to move below 1.25V, such as in a result of VTT load's pulling more current from the filter capacitor 59, OP-AMP 45 will have a low output voltage, and thus turn off N-type MOSFET 47. OP-AMP 44 will have a higher output voltage, which in turn pushes $V_{GS}$ of N-type MOSFET 46 higher and increases the supplied current to VTT pin 48, restoring the VTT voltage 58 to 1.25V.

On the other hand, if the VTT voltage 58 tries to move above 1.25V, such as when VTT load sends back current from the data bus system to filter capacitor 59, OP-AMP 44 will have a low output voltage and turn off N-type MOSFET 46. OP-AMP 45 will have a higher output voltage, and thus will pull $V_{GS}$ of N-type MOSFET 47 higher, and sink more current coming from VTT voltage 58 to ground, quickly restoring VTT voltage 58 to 1.25V.

Since the input (source) of P-MOSFET 34 is connected to 3.3V input, the maximum voltage available for controlling the $V_{SG}$ of P-MOSFET 34 is 3.3V.

Similarly, the maximum voltage available for controlling the $V_{GS}$ of N-MOSFET 46 is 3.3V−1.25V=2.05V. The maximum voltage available for controlling the $V_{GS}$ of N-MOSFET 47 is 3.3V.

Figure 3:
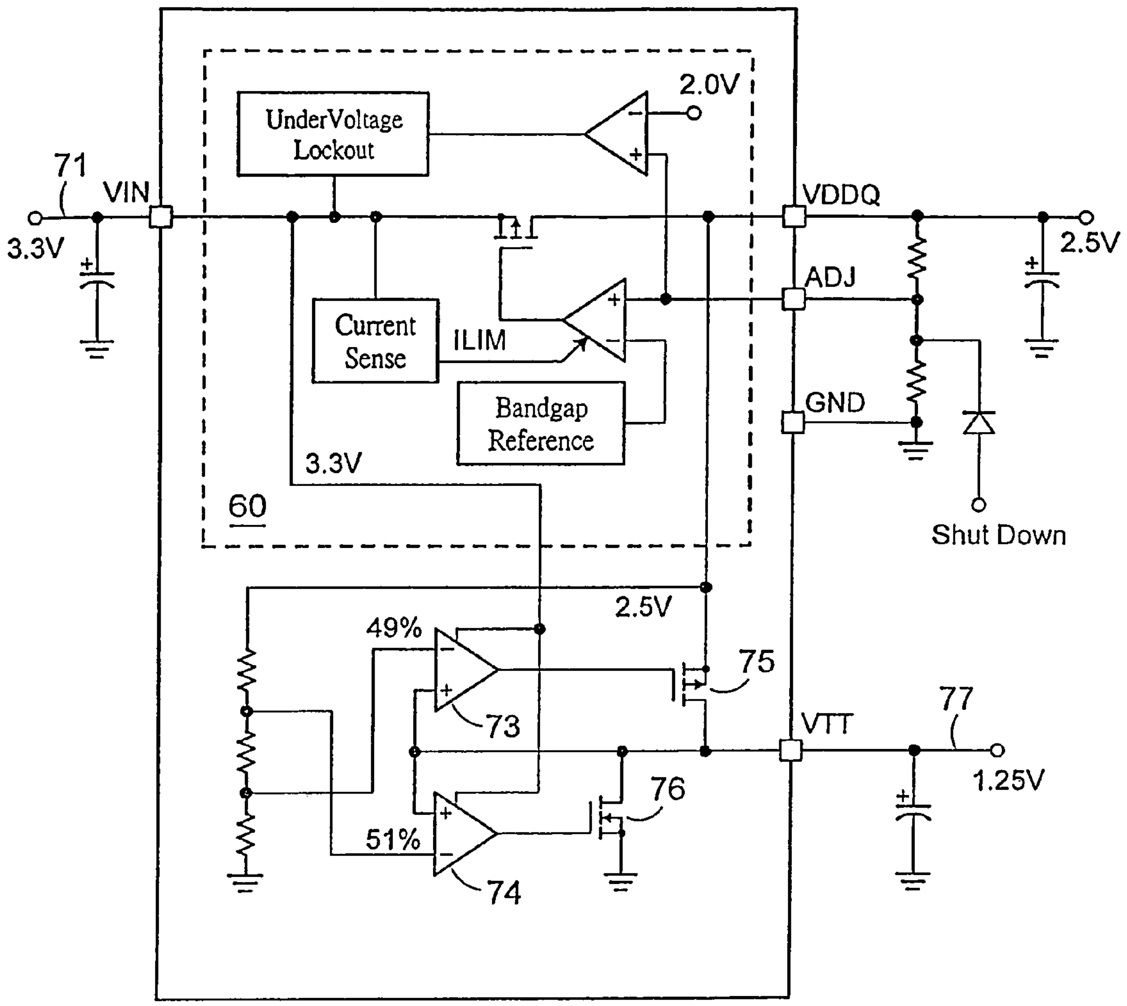
FIG. 3 shows a second preferred embodiment of the present invention using a P-type MOSFET for VDDQ regulator and a P-type and a N-type MOSFETs for VTT regulator.

FIG. 3 shows a second preferred embodiment of the present invention. This embodiment is similar to the circuit shown in FIG. 2, except that N-type MOSFET 46 is replaced by P-type MOSFET 75, and OP-AMP 44 is replaced by OP-AMP 73, which has a reference voltage connected to its negative input, and that VTT voltage 77 connected to its positive input. A 3.3V of the input 71 provides input power to the first LDO 60 as well as the operating voltage for OP-AMP 73 and OP-AMP 74.

In comparison to N-type MOSFET 46 of FIG. 2, which has a maximum voltage of 2.05V available for controlling its $V_{GS}$, the maximum voltage available for controlling the $V_{SG}$ of P-MOSFET 75 is 2.5V. The maximum voltage available for controlling the $V_{GS}$ of N-type MOSFET 76 remains 3.3V.

Figure 4:
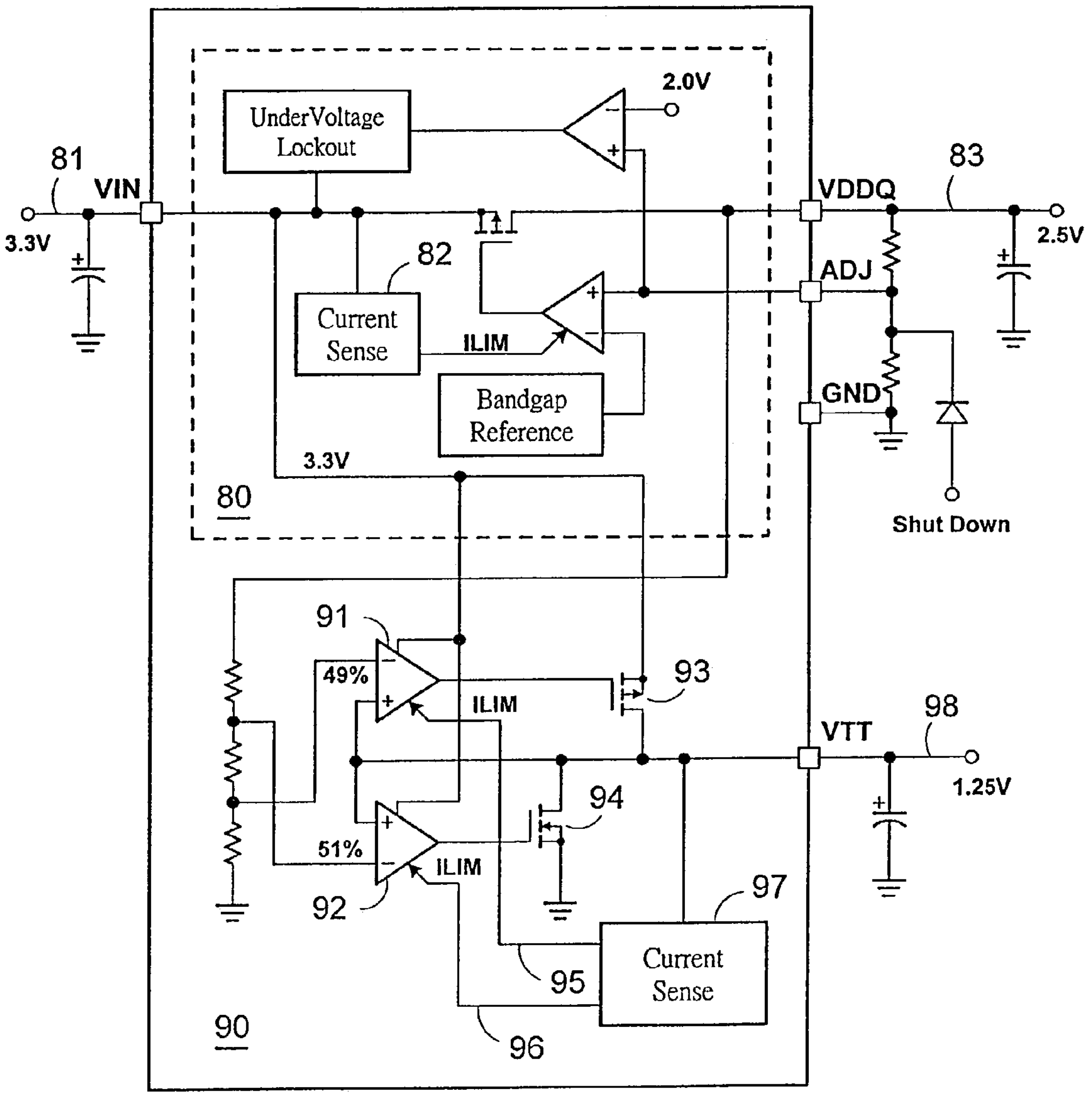
FIG. 4 shows a third preferred embodiment of the present invention.

FIG. 4 shows a third preferred embodiment of the present invention. This embodiment is similar to the circuit as shown in FIG. 3, except that P-type MOSFET 75 in FIG. 3, whose input is connected to the VDDQ voltage 83, is replaced by a P-type MOSFET 93, whose input is connected directly to 3.3V. The maximum voltage available for controlling the $V_{SG}$ of P-type MOSFET 93 now becomes 3.3V The higher $V_{SG}$ range allows a smaller device for P-type MOSFET 93.

When P-MOSFET 93 sources current to VTT voltage 98, its voltage steps down from 3.3V to 1.25V directly. However, its overall efficiency is exactly the same as that of the circuit shown in FIG. 3. When sourcing current, the voltage of the MOSFET 75 of FIG. 3 steps down from. 2.5V VDDQ voltage 72 to 1.25V. Nevertheless, because the power of the VDDQ voltage 72 is originally derived from the 3.3V of MOSFET 61 in FIG. 3, the overall efficiency remaining the same.

However, since MOSFET 93 derives VTT power directly from the input voltage 81, instead of from the VDDQ voltage 83, it cannot share the current limit circuit 82 of the first LDO 80. A separate current sense circuit 97 is required to provide the current limit or over-current protection for sourcing current to and sinking current from VTT voltage 98. If current sense circuit 97 detects a sourcing current exceeding a preset value, it will bring a control line 95 to a higher voltage, which in turn will force OP-AMP 91 to reduce the $V_{SG}$ of P-type MOSFET 93, thus cutting down the output current to VTT voltage 98.

On the other hand, if current sense 97 detects a sinking current exceeding a preset value, it will bring a control line 96 to a higher voltage, which in turn will force OP-AMP 92 to reduce the $V_{GS}$ of N-type MOSFET 94, thus cutting down the current through N-type MOSFET 94.

Figure 5:
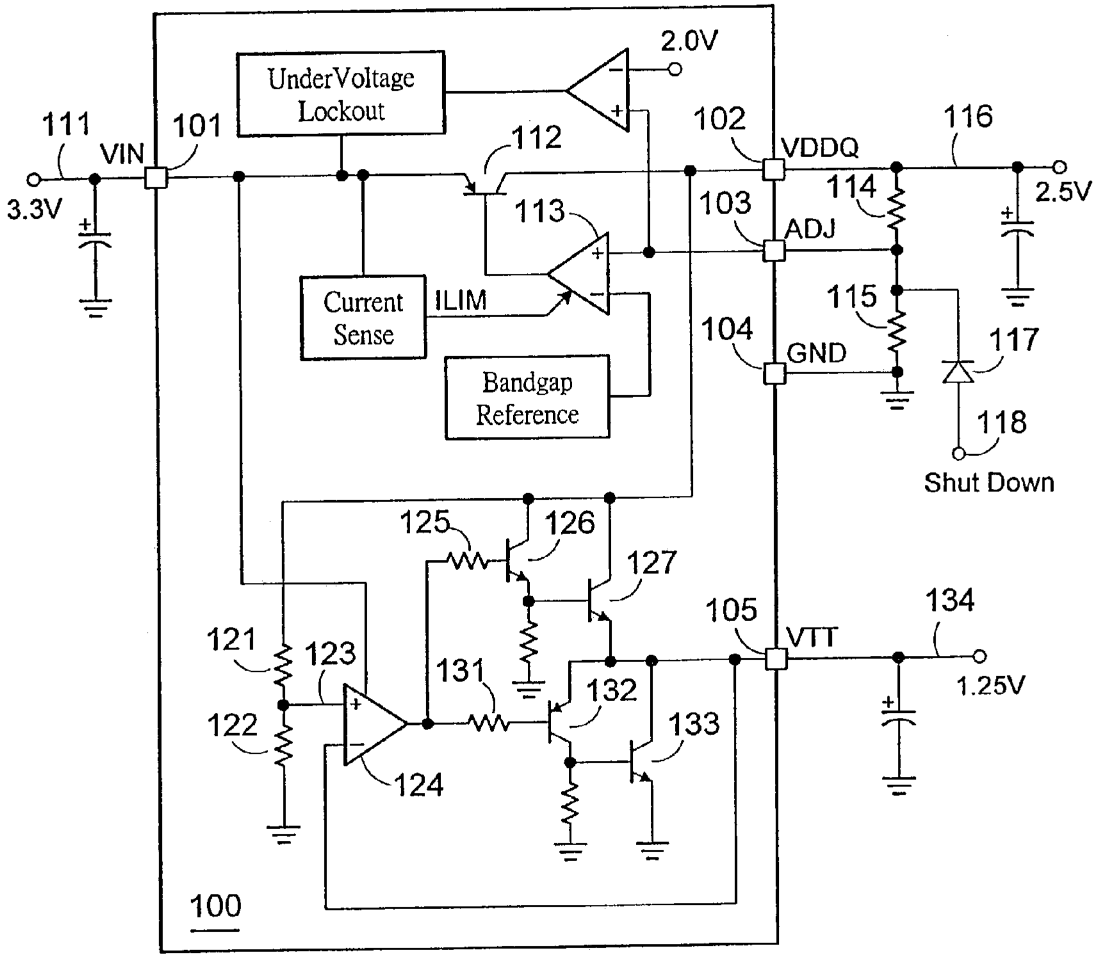
FIG. 5 shows a fourth preferred embodiment of the present invention using a PNP power transistor for VDDQ regulator and two NPN power transistors for VTT regulator.

FIG. 5 shows a fourth preferred embodiment of the present invention. The dual-output regulator 100 comprises a PNP power transistor 112 for regulating VDDQ voltage 116, and two NPN power transistors 127 and 133 for regulating VTT voltage 134. Regulator 100 can be implemented with a bipolar silicon fabrication process.

The input (emitter) terminal of PNP transistor 112 is connected to input voltage 111 via VIN pin 101. The output (collector) terminal of PNP transistor 112 is connected to VDDQ pin 102. The base current for PNP transistor 112 is drained to ground with the control of OP-AMP 113. Fabricated with a high-gain bipolar transistor, PNP transistor 112 is capable of providing a low dropout voltage of less than 500 mV at 5A of output current.

A voltage divider comprising resistors 114 and 115 is connected to the non-inverting input of OP-AMP 113 via ADJ pin 103. As described in FIG. 2, this ADJ pin 103 is also connected to the shutdown input 118 via an isolating diode 117. The internal ground of regulator 100 is connected to an external ground via a GND pin 104.

The input (collector) of NPN transistor 127 is connected to VDDQ pin 102 internally. The output (emitter) of NPN transistor 127 sources current to VTT voltage 134 via VTT pin 105. A second NPN transistor 126 supplies the base current of NPN transistor 127, whereas OP-AMP 124 supplies the base current of NPN transistor 126 via a base resistor 125. NPN transistors 126 and 127 form a Darlington pair in a cascade structure. Almost all the collector current of NPN transistor 126 flows into the base of NPN transistor 127. Since VTT voltage 134 is 1.25V, the operating voltage required to drive Darlington pair 126 and 127 is about 1.25V+0.7V+0.7V=2.65V. OP-AMP 124 can easily support this voltage, with input voltage 111 supplying a 3.3V operating voltage to OP-AMP 124.

The input (collector) terminal of NPN transistor 133 is connected to VTT pin 105 internally. The output (emitter) terminal of NPN transistor 133 is connected to ground. A second PNP transistor 132 supplies the base current of NPN transistor 133, whereas OP-AMP 124 controls the base current of PNP transistor 132 via a base resistor 131. PNP transistor 132 and NPN transistor 133 form a second Darlington pair. Since VTT voltage 134 is 1.25V, the operating voltage required to drive PNP transistor 132 is approximately 1.25V−0.7V=0.55V. PNP transistor 132 can easily operate in this condition.

Unlike the above-mentioned MOSFET embodiments of the present invention, as shown in FIGS. 2, 3 and 4, a single OP-AMP 124 controls both Darlington pairs 126–127 and 132–133. OP-AMP 124 is operated at 3.3V. Its output voltage range is between 0.2V and 3.1V or better. To drive Darlington pair 126–127 to source current to VTT voltage 134, OP-AMP 124 needs an output voltage slightly higher than 2.65V. To drive Darlington pair 132–133 to sink current from VTT voltage 134, OP-AMP 124 needs an output voltage of slightly lower than 0.55V.

An internal voltage divider, comprising resistors 121 and 122 of a same resistance value, provides a reference voltage 123 of exactly 50% of VDDQ voltage 116 to the positive input of OP-AMP 124. On the other hand, the inverting input of OP-AMP 124 is connected internally to VTT pin 105. Since OP-AMP 124 has a high DC gain, it will force VTT voltage 134 to follow the reference voltage 123, which is exactly one half of VDDQ voltage 116.

When VTT voltage 134 is trying to drop below 50% of VDDQ voltage 116, such as in the case of a data bus system drawing more current from VTT voltage 134, the output voltage of OP-AMP 124 starts to increase. As soon as the output voltage of OP-AMP 124 reaches 0.55V, Darlington pair 132–133 turns off. As the voltage has risen to approximately 2.65V, Darlington pair 126–127 starts to turn on, thus supplying more current to VTT voltage 134 and restoring VTT voltage 134 quickly to 50% of VDDQ voltage 116.

When VTT voltage 134 is trying to rise above 50% of VDDQ voltage 116, such as in the case of a data bus system returning current to VTT voltage 134, the output voltage of OP-AMP 124 starts to decrease from a high level to a low level. As soon as the output voltage of OP-AMP 124 drops below 2.65V, Darlington pair 126–127 turns off. As the voltage has dropped to approximately 0.55V, Darlington pair 132–133 starts to turn on, thus sinking more current from VTT voltage 134, and quickly restoring VTT voltage 134 to 50% of VDDQ voltage 116 level.

The description above shows that the invention is able to package the two LDOs into a chip with only five pins. Each LDO provides a VDDQ voltage or a VTT voltage via at least one transistor (i.e., MOSFET or BJT) and at least one operational amplifier. The VTT voltage is half of the VDDQ voltage, saving the cost of the package and capable of using small PCB.

Although the present invention has been explained in relation to its preferred embodiment, it is to be understood that many other possible modifications and variations can be made without departing from the spirit and scope of the invention as hereinafter claimed.

What is claimed is:

1. A dual-output voltage regulator packaged in a 5-pin chip providing a first terminal voltage and a second terminal voltage to double data rate (DDR) DRAM, comprising:

a first regulator unit including a first transistor unit and a comparator unit, the first regulator unit receiving an input voltage and providing the first terminal voltage via the first transistor unit, the comparator unit connected to one of the pins for inputting a shutdown signal via this pin, rendering the comparator unit with shutdown function ; and a second regulator unit including a second transistor unit, a third transistor unit and a divided voltage unit, the second regulator receiving the input voltage and the first terminal voltage such that the divided voltage unit provides a plurality of reference voltages for directing the second and third transistors to output the second terminal voltage, wherein the second terminal voltage is half the first terminal voltage and the second regulator unit is capable of sourcing current and sinking current.

2. The dual-output voltage regulator as claimed in claim 1, wherein the five pins are input voltage pin (VIN), first terminal voltage pin (VDDQ), adjustment pin (ADJ), grounding pin (GNP) and second terminal voltage pin (VTT).

3. The dual-output voltage regulator as claimed in claim 1, wherein when the second regulator unit is in a sourcing current state, the second regulator unit keeps the second terminal voltage at 49% of the first terminal voltage.

4. The dual-output voltage regulator as claimed in claim 1, wherein when the second regulator unit is in a sinking current state, the second regulator unit keeps the second terminal voltage at 51% of the first terminal voltage.

5. The dual-output voltage regulator as claimed in claim 1, wherein the first regulator unit further includes a first operational amplifier unit and a first current limit unit; the input of the first transistor unit receives the input voltage; and the first transistor unit provides the first terminal voltage via one of the five pins.

6. The dual-output voltage regulator as claimed in claim 1, wherein the pin connected to the comparator unit is further connected to a first voltage divider component and a second voltage divider component, and there is a first divided voltage node between the first voltage divider component and the second voltage divider component.

7. The dual-output voltage regulator as claimed in claim 6, wherein a non-inverting input of the first operational amplifier unit is connected to the first divided voltage node, and the inverting input of the first operational amplifier unit is connected to a bandgap reference.

8. The dual-output voltage regulator as claimed in claim 5, wherein the first current limit unit is provided for detecting the current passing through the first transistor unit and directing the first transistor unit to output the first terminal voltage via the first operational amplifier unit.

9. The dual-output voltage regulator as claimed in claim 5, wherein the pin comparator unit connected to a diode provides the shutdown function by controlling the diode.

10. The dual-output voltage regulator as claimed in claim 6, wherein the second regulator unit further includes a second operational amplifier unit and a third operational amplifier unit; the input of the second transistor unit is connected to the output of the first transistor unit; the output of the second transistor unit is connected to one of the pins for providing the second terminal voltage; the output of the second transistor unit is connected to the input of the third transistor unit, an inverting input of the second operational amplifier unit and a non-inverting input of the third operational amplifier unit.

11. The dual-output voltage regulator as claimed in claim 1O, wherein the divided voltage unit has a second divided voltage node and a third divided voltage node; the non-inverting input of the second operational amplifier unit is connected to the third divided voltage node; the inverting input of the third operational amplifier unit is connected to the second divided voltage node, such that the second operational amplifier unit controls the second transistor unit; and the third operational amplifier unit controls the third transistor unit, keeping the second terminal voltage one half of the first terminal voltage.

12. The dual-output voltage regulator as claimed in claim 1, wherein the first transistor unit is a P-type MOSFET.

13. The dual-output voltage regulator as claimed in claim 1, wherein the second transistor unit and the third transistor unit are N-type MOSFETs.

14. The dual-output voltage regulator as claimed in claim 1, wherein the second regulator unit further includes a second operational amplifier unit and a third operational amplifier unit; the input of the second transistor unit is connected to the output of the first transistor unit; the output of the second transistor unit is connected to one of the five pins for outputting the second terminal voltage; the output of the second transistor unit is also connected to the input of the third transistor unit, the non-inverting input of the second operational amplifier unit and the non-inverting input of the third operational amplifier unit.

15. The dual-output voltage regulator as claimed in claim 14, wherein the divided voltage unit has a first terminal connected to a second divided voltage node and a second terminal connected to a third divided voltage node; the inverting input of the second operational amplifier unit is connected to the third divided voltage node; the inverting input of the third operational amplifier unit is connected to the second divided voltage node such that the second operational amplifier unit controls the second transistor unit, and that the third operational amplifier unit controls the third transistor unit in order to keep the second terminal voltage half the first terminal voltage.

16. The dual-output voltage regulator as claimed in claim 14, wherein the second transistor unit is a P-type MOSFET and the third transistor unit is an N-type MOSFET.

17. The dual-output voltage regulator as claimed in claim 1, wherein the second regulator unit further includes a second operational amplifier unit, a third operational amplifier unit and a second current limit unit; the second transistor unit is provided for receiving the input voltage; the output of the second transistor unit is connected to the input of the third transistor unit, the non-inverting input of the second operational amplifier unit, the non-inverting input of the third operational amplifier unit and the second current limit unit.

18. The dual-output voltage regulator as claimed in claim 17, wherein the divided voltage unit has a first terminal connected to a second divided voltage node and a second terminal connected to a third divided voltage node; the input of the divided voltage unit is connected to the output of the first transistor unit; the inverting input of the second operational amplifier unit and the inverting input of the third operational amplifier unit are connected to the divided voltage unit respectively in order to keep the second terminal voltage half the first terminal voltage by controlling the second transistor unit and the third transistor unit respectively.

19. The dual-output voltage regulator as claimed in claim 17, wherein the second current limit unit provides current limit or over-current protection for the second regulator.

20. The dual-output voltage regulator as claimed in claim 17, wherein the second transistor unit is a P-type MOSFET, and the third transistor unit is an N-type MOSFET.

21. A dual-output voltage regulator packaged in a 5-pin chip providing a first terminal voltage and a second terminal voltage to double data rate DDR DRAM, comprising:

a first regulator unit including a first transistor unit and a comparator unit, the first regulator unit receiving an input voltage from a PC system and providing the first terminal voltage via the first transistor unit, the comparator unit connected to one of the five pins to provide a shutdown function by inputting a shutdown signal via the said pin; and a second regulator unit including a first Darlington pair circuit and a second Darlington pair circuit, and receiving the input voltage and the first terminal voltage to output the second terminal voltage, wherein the second terminal voltage is one half of the first terminal voltage, and the second regulator unit is capable of sourcing current and sinking current.

22. The dual-output voltage regulator as claimed in claim 21, wherein the five pins are input voltage pin (VIN), first terminal voltage pin (VDDQ), adjustment pin (ADJ), grounding pin (GND) and second terminal voltage pin (VTT).

23. The dual-output voltage regulator as claimed in claim 21, wherein when in a sourcing current state, the second regulator unit keeps the second terminal voltage at 49% of the first terminal voltage.

24. The dual-output voltage regulator as claimed in claim 21, wherein when in a sinking current state, the second regulator unit keeps the second terminal voltage at 51% of the first terminal voltage.

25. The dual-output voltage regulator as claimed in claim 21, wherein the first regulator unit further includes a first operational amplifier unit and a current limit unit; the input of the first transistor unit receives the input voltage; the output of the first transistor unit is connected to one of the five pins to provide the first terminal voltage.

26. The dual-output voltage regulator as claimed in claim 21, wherein the said pin connected to the comparator unit is further connected to a first voltage divider component and a second voltage divider component, and there is a first divided voltage node between the first voltage divider component and the second voltage divider component.

27. The dual-output voltage regulator as claimed in claim 26, wherein a non-inverting input of the first operational amplifier unit is connected to the first divided voltage node, and an inverting input of the first operational amplifier unit is connected to a bandgap reference.

28. The dual-output voltage regulator as claimed in claim 24, wherein a current limit unit is provided for detecting the current passing through the first transistor unit and directing the first transistor unit to shut down the first terminal voltage via the operational amplifier unit.

29. The dual-output voltage regulator as claimed in claim 21, wherein the said pin, to which the comparator unit is connected, provides a shutdown function under the control of an external shutdown signal.

30. The dual-output voltage regulator as claimed in claim 21, wherein the second regulator unit further includes a second operational amplifier unit and a divided voltage unit; a non-inverting input of the second operational amplifier unit is connected to the divided voltage unit; and inverting input of the second operational amplifier unit is connected to the input of the second Darlington pair circuit.

31. The dual-output voltage regulator as claimed in claim 21, wherein the input of the first Darlington pair circuit is connected to the output of the first transistor unit, and the output of the first Darlington pair circuit is connected to the input of the second Darlington pair circuit.

32. The dual-output voltage regulator as claimed in claim 21, wherein the first Darlington pair circuit comprises a pair of NPN power transistors.

33. The dual-output voltage regulator as claimed in claim 21, wherein the second Darlington pair circuit comprises a PNP power transistor and an NPN power transistor.

* * * * *